United States Patent
Shanbhogue et al.

(10) Patent No.: US 12,346,695 B2
(45) Date of Patent: Jul. 1, 2025

(54) COPY A SUBSET OF STATUS FLAGS FROM A CONTROL AND STATUS REGISTER TO A FLAGS REGISTER

(71) Applicant: Intel Corporation, Santa Clara, CA (US)

(72) Inventors: Vedvyas Shanbhogue, Austin, TX (US); Robert Valentine, Kiryat Tivon (IL); Mark Charney, Lexington, MA (US); Venkateswara Madduri, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 768 days.

(21) Appl. No.: 17/485,374

(22) Filed: Sep. 25, 2021

(65) Prior Publication Data
US 2023/0098724 A1 Mar. 30, 2023

(51) Int. Cl.
*G06F 9/30* (2018.01)
(52) U.S. Cl.
CPC ...... *G06F 9/30145* (2013.01); *G06F 9/30018* (2013.01); *G06F 9/30038* (2023.08); *G06F 9/30101* (2013.01); *G06F 9/3017* (2013.01); *G06F 9/30189* (2013.01)
(58) Field of Classification Search
None
See application file for complete search history.

(56) References Cited

U.S. PATENT DOCUMENTS

| | | | |
|---|---|---|---|
| 5,765,216 A | 6/1998 | Weng et al. | |
| 7,996,659 B2* | 8/2011 | Renno | G06F 9/30181 |
| | | | 712/228 |
| 2004/0064683 A1 | 4/2004 | Kalluri et al. | |
| 2011/0153990 A1* | 6/2011 | Ottoni | G06F 9/30058 |
| | | | 712/225 |
| 2019/0196821 A1* | 6/2019 | Madduri | G06F 9/30098 |

FOREIGN PATENT DOCUMENTS

| | | |
|---|---|---|
| EP | 2226731 A1 | 9/2010 |
| WO | 98/20422 A1 | 5/1998 |

OTHER PUBLICATIONS

Office Action, EP App. No. 22184276.8, Oct. 27, 2023, 5 pages.
Office Action, EP App. No. 22184276.8, May 2, 2024, 05 pages.
Extended European Search Report and search Opinion for Application No. 22184276.8, Dec. 23, 2022, 07 pages.
Office Action, EP App. No. 22184276.8, Sep. 11, 2024, 4 pages.

* cited by examiner

*Primary Examiner* — Eric Coleman
(74) *Attorney, Agent, or Firm* — NICHOLSON DE VOS WEBSTER & ELLIOTT LLP

(57) ABSTRACT

Techniques for copying a subset of status flags from a control and status register to a flags register in response to an instruction are described. An exemplary instruction includes a field for an opcode, the opcode to indicate execution circuitry is to copy from a first register a saturation flag value, an overflow value, and a carry value to a second register into one or more instructions of a different instruction set.

14 Claims, 15 Drawing Sheets

```
┌─────────────────────────────────────────────────────────────────────────┐
│ FETCH A SINGLE INSTRUCTION HAVING FIELDS FOR AN OPCODE, THE OPCODE TO   │
│ INDICATE EXECUTION CIRCUITRY IS TO COPY A FIRST PROPER SUBSET OF STATUS │
│ FLAGS FROM A FIRST REGISTER TO A SECOND REGISTER AND, IN SOME           │
│ EMBODIMENTS, ZERO A SECOND PROPER SUBSET OF STATUS FLAGS IN THE         │
│ SECOND REGISTER  301                                                    │
└─────────────────────────────────────────────────────────────────────────┘
                                      │
                                      ▼
┌─────────────────────────────────────────────────────────────────────────┐
│ TRANSLATE THE FETCHED INSTRUCTION INTO ONE OR MORE INSTRUCTIONS  302    │
└─────────────────────────────────────────────────────────────────────────┘
                                      │
                                      ▼
┌─────────────────────────────────────────────────────────────────────────┐
│ DECODE THE ONE OR MORE INSTRUCTIONS 303                                 │
└─────────────────────────────────────────────────────────────────────────┘
                                      │
                                      ▼
┌─────────────────────────────────────────────────────────────────────────┐
│ RETRIEVE DATA ASSOCIATED WITH THE SOURCE OPERANDS AND SCHEDULE 305      │
└─────────────────────────────────────────────────────────────────────────┘
                                      │
                                      ▼
┌─────────────────────────────────────────────────────────────────────────┐
│ EXECUTE THE DECODED INSTRUCTION(S) ACCORDING TO THE OPCODE OF THE       │
│ SINGLE INSTRUCTION  307                                                 │
└─────────────────────────────────────────────────────────────────────────┘
                                      │
                                      ▼
┌─────────────────────────────────────────────────────────────────────────┐
│ COMMIT A RESULT OF THE EXECUTED INSTRUCTION(S)                          │
│ 309                                                                     │
└─────────────────────────────────────────────────────────────────────────┘
```

FIG. 3

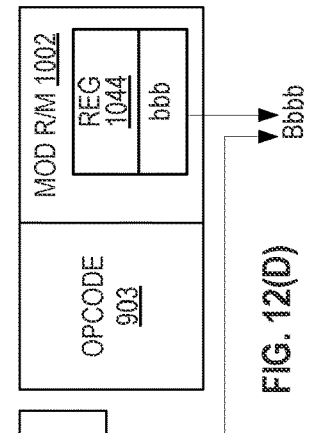
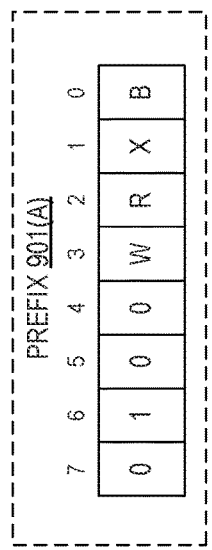
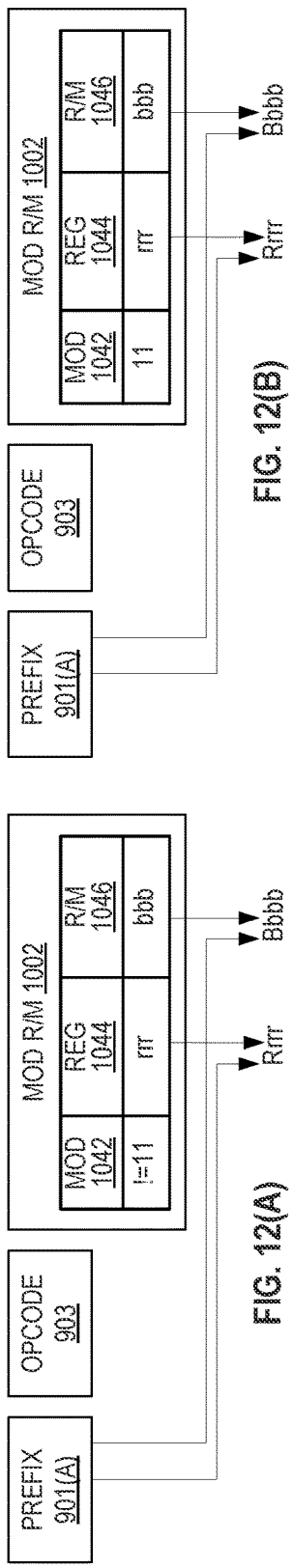
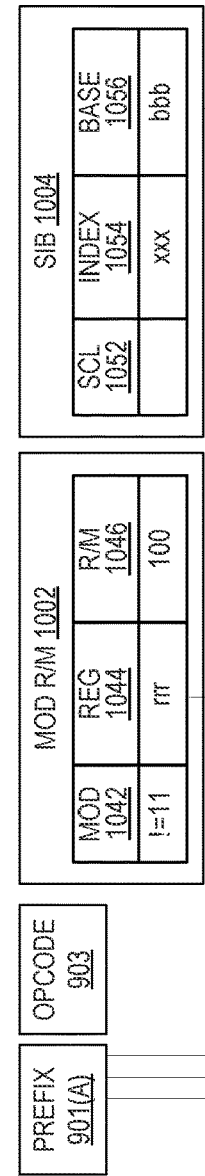
FIG. 11
FIG. 12(A)
FIG. 12(B)
FIG. 12(C)
FIG. 12(D)

COPY A SUBSET OF STATUS FLAGS FROM A CONTROL AND STATUS REGISTER TO A FLAGS REGISTER

BACKGROUND

In some processors, a control and status register provides control and/or status bits for operations performed on at least a proper subset of registers.

BRIEF DESCRIPTION OF DRAWINGS

Various embodiments in accordance with the present disclosure will be described with reference to the drawings, in which:

FIG. 3 illustrates embodiments of a method performed to process a DVPTESTMXCSR instruction.

FIG. 11 illustrates embodiments of a first prefix.

FIGS. 12(A)-(D) illustrate embodiments of how the R, X, and B fields of the first prefix 901(A) are used.

DETAILED DESCRIPTION

The present disclosure relates to methods, apparatus, systems, and non-transitory computer-readable storage media for an instruction to copy integer status flags from a control and/or status register to a flags register.

Some of integer instructions after execution set flags such as saturation, overflow, and underflow flags in a control and/or status register. For example, many of the sensing algorithms functions result in saturating, overflow, or underflow when performing vector packed operations. In some instances, software would like to check if these flags have been set and then branch to specific instruction code sequence. Unfortunately, multiple instructions are needed to perform saturation operations and to check the status flags.

Detailed herein are embodiments of a single instruction, and its support, for copying saturation, overflow, and underflow flags from a control and/or status register to a flags register. This instruction is useful to improve the performance of at least sensor algorithms.

Figure 1:
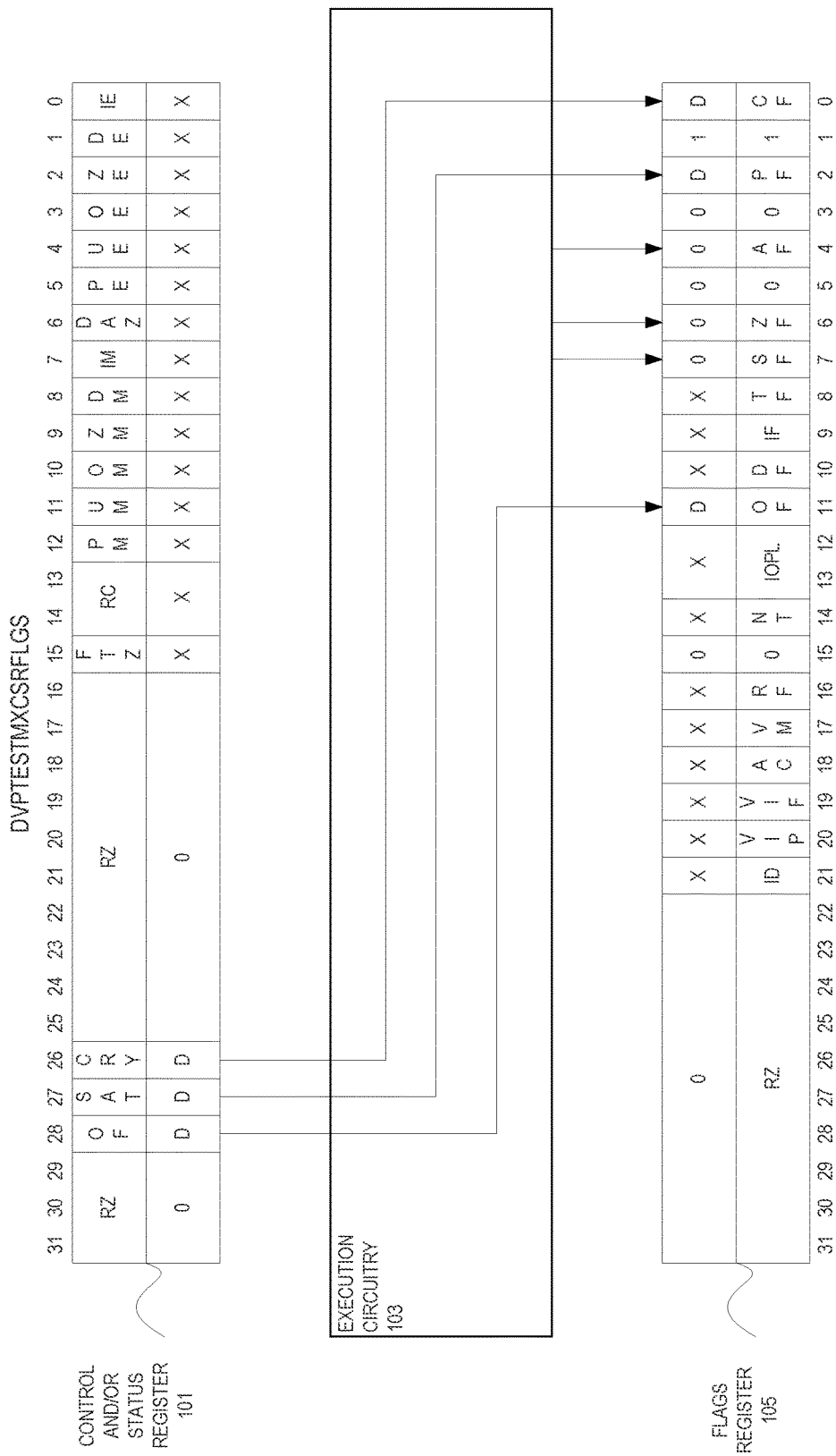
FIG. 1 illustrates examples of an execution of a copy integer status flags from a control and/or status register to a flags register instruction.

FIG. 1 illustrates examples of an execution of a copy integer status flags from a control and/or status register to a flags register instruction. As shown the control and/or status register 101 stores control and status information. In this example, the control and/or status register 101 not only stores control and status information for floating-point operations, but also integer status information. However, not all embodiments will have control and/or status information for both floating-point and integer. In some examples, the control and/or status register 101 is called MXCSR.

In this example, the control and/or status register (CSR) 101 contains flag and mask bits for SIMD floating-point exceptions, a rounding control field for single instruction, multiple data (SIMD) or vector floating-point operations, a flush-to-zero flag that provides a means of controlling underflow conditions on SIMD or vector floating-point operations, and a denormals-are-zeros flag that controls how SIMD or vector floating-point instructions handle denormal source operands.

Bits 0 through 5 indicate whether a SIMD floating-point exception has been detected. They are "sticky" flags. That is, after a flag is set, it remains set until explicitly cleared. Bits 7 through 12 provide individual mask bits for the SIMD floating-point exceptions. An exception type is masked if the corresponding mask bit is set, and it is unmasked if the bit is clear. These mask bits are set upon a power-up or reset. This causes all SIMD floating-point exceptions to be initially masked.

Bits 13 and 14 (the rounding control [RC] field) control how the results of SIMD floating-point instructions are rounded. Bit 15 (FTZ) of the enables a flush-to-zero mode, which controls the masked response to a SIMD floating-point underflow condition. When the underflow exception is masked and the flush-to-zero mode is enabled, the processor performs the following operations when it detects a floating-point underflow condition.

Bit 6 (DAZ) enables the denormals-are-zeros mode, which controls the processor's response to a SIMD floating-point denormal operand condition. When the denormals-are-zeros flag is set, the processor converts all denormal source operands to a zero with the sign of the original operand before performing any computations on them.

Bit 26 stores an indication of a carry from an execution of an integer instruction. Bit 27 stores an indication of a saturation from an execution of an integer instruction. Bit 28 stores an indication of an overflow from an execution of an integer instruction.

A flags register 105 contains a group of status flags, a control flag, and a group of system flags. The status flags (bits 0, 2, 4, 6, 7, and 11) of the EFLAGS register indicate the results of arithmetic instructions, such as the ADD, SUB, MUL, and DIV instructions. The status flag functions are:
CF (bit 0) Carry flag (set if an arithmetic operation generates a carry or a borrow out of the most significant bit of the result and indicates an overflow condition for unsigned-integer arithmetic. It is also used in multiple-precision arithmetic); PF (bit 2) Parity flag (set if the least-significant byte of the result contains an even number of 1 bits); AF (bit 4) Auxiliary Carry flag (set if an arithmetic operation generates a carry or a borrow out of bit 3 of the result and may be used in binary-coded decimal (BCD) arithmetic); ZF (bit 6) Zero flag (set if the result is zero); SF (bit 7) Sign flag (set equal to the most-significant bit of the result, which is the sign bit of a signed integer); and OF (bit 11) Overflow flag (set if the integer result is too large a positive number or too small a negative number (excluding the sign-bit) to fit in the destination operand and indicates an overflow condition for signed-integer (two's complement) arithmetic).

Some condition instructions such Jcc (jump on condition code cc), SETcc (byte set on condition code cc), LOOPcc, and CMOVcc (conditional move) use one or more of the status flags as condition codes and test them for branch, setbyte, or end-loop conditions.

Bit 10 is a direction flag which controls string instructions (either to auto-decrement or auto-increment).

In some examples, system flags and IOPL field control operating-system or executive operations. The functions of the system flags are as follows: TF (bit 8) Trap flag (set to enable single-step mode for debugging; clear to disable single-step mode); IF (bit 9) Interrupt enable flag Controls the response of the processor to maskable interrupt requests. Set to respond to maskable interrupts; cleared to inhibit maskable interrupts); IOPL (bits 12 and 13) I/O privilege level field (indicates the I/O privilege level of the currently running program or task); NT (bit 14) Nested task flag (controls the chaining of interrupted and called tasks); RF (bit 16) Resume flag (controls the processor's response to debug exceptions); VM (bit 17) Virtual mode flag (set to enable a virtual mode); AC (bit 18) Alignment check (or access control) flag (if the AM bit is set in a control register, alignment checking of user-mode data accesses is enabled if and only if this flag is 1); VIF (bit 19) Virtual interrupt flag (virtual image of the IF flag); VIP (bit 20) Virtual interrupt pending flag (set to indicate that an interrupt is pending; clear when no interrupt is pending; and ID (bit 21) Identification flag (the ability of a program to set or clear this flag indicates support for a CPUID instruction).

As shown, an execution of the copy integer status flags from a control and/or status register to a flags register instruction (here shown with an opcode mnemonic of DVPTESTMXCSRFLGS) causes a copy of the data value of the overflow flag, saturation flag, and carry flag of the control and/or status register 101 to be copied into the flags register 105 using execution circuitry 103. Note that if there is not a saturation flag in the flags register 105, some other flag is to be set. In some examples, CSR[28]→FLAGS[11], CSR[27]→FLAGS[11], and CSR[28]→FLAGS[11]. In some examples, the zero flag, auxiliary carry flag, and sign flag are also set to zero.

Figure 2:
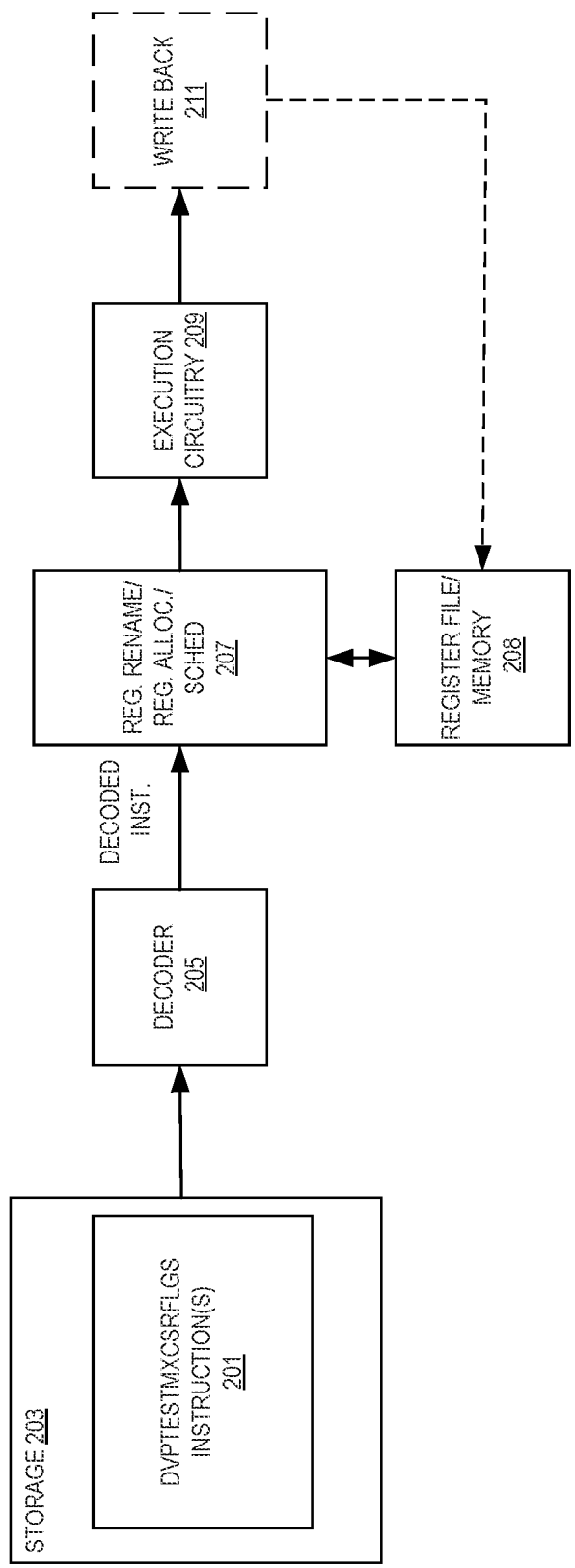
FIG. 2 illustrates examples of hardware to process an instruction such as DVPTESTMXCSR instruction.

FIG. 2 illustrates examples of hardware to process an instruction such as DVPTESTMXCSR instruction. As illustrated, storage 203 stores a DVPTESTMXCSR instruction 201 to be executed.

The instruction 201 is received by decode circuitry 205. For example, the decode circuitry 205 receives this instruction from fetch logic/circuitry. The instruction includes fields for an opcode, first and second sources, and a destination. In some examples, the sources and destination are registers, and in other embodiments one or more are memory locations. In some examples, the opcode details which arithmetic operation is to be performed.

More detailed embodiments of at least one instruction format will be detailed later. The decode circuitry 205 decodes the instruction into one or more operations. In some examples, this decoding includes generating a plurality of micro-operations to be performed by execution circuitry (such as execution circuitry 209). The decode circuitry 205 also decodes instruction prefixes.

In some examples, register renaming, register allocation, and/or scheduling circuitry 207 provides functionality for one or more of: 1) renaming logical operand values to physical operand values (e.g., a register alias table in some examples), 2) allocating status bits and flags to the decoded instruction, and 3) scheduling the decoded instruction for execution on execution circuitry out of an instruction pool (e.g., using a reservation station in some examples).

Registers (register file) and/or memory 208 store data as operands of the instruction to be operated on by execution circuitry 209. Exemplary register types include a control and/or status register, a flags register, packed data registers, general purpose registers, and floating-point registers.

Execution circuitry 209 executes the decoded instruction. Exemplary detailed execution circuitry is shown in FIGS. 1, 6, etc. The execution of the decoded instruction causes the execution circuitry to copy a first proper subset of status flags from a first register to a second register and, in some examples, zero a second proper subset of status flags in the second register. In some examples, the first proper subset of status flags is the saturation flag, overflow flag, and carry flag. In some examples, the second proper subset of status flags are a zero flag, an auxiliary carry flag, and a sign flag. The first register is a control and/or status register and the second register is a flags register.

In some examples, retirement/write back circuitry 211 architecturally commits the destination register into the registers or memory 208 and retires the instruction.

FIG. 3 illustrates embodiments of a method performed to process a DVPTESTMXCSR instruction. For example, a processor core as shown in FIG. 6(B), a pipeline as detailed below, etc. performs aspects of this method.

At 301, an instance of a single instruction is fetched. For example, a DVPTESTMXCSR instruction is fetched. The DVPTESTMXCSR instruction includes fields for an opcode.

In some examples, the fetched instance of the single instruction of the first instruction set is translated into one or more instructions of a second instruction set at 302. This translation may be done in hardware, software, or a combination thereof depending on the implementation.

The instance of the single instruction, or the one or more translated instructions of the second instruction set, is/are decoded at 303. In some examples, the translation and decoding are merged.

Data values associated with the operands of the decoded instruction(s) are retrieved at 305. For example, data values of a control and/or status register are retrieved.

At 307, the decoded instruction(s) is/are executed by execution circuitry (hardware) such as that detailed herein to perform the operation indicated by the instance of the single instruction. For the DVPTESTMXCSR instruction, the execution will cause execution circuitry to copy a first proper subset of status flags from a first register to a second register and, in some examples, zero a second proper subset of status flags in the second register. In some examples, the first proper subset of status flags is the saturation flag, overflow flag, and carry flag. In some examples, the second proper subset of status flags are a zero flag, an auxiliary carry flag, and a sign flag. The first register is a control and/or status register and the second register is a flags register.

In some examples, the instruction is committed or retired at 309.

Detailed herein are examples of hardware, software, etc. to execute the above described instructions. For example, what is described below details aspects of instruction execution including various pipeline stages such as fetch, decode, schedule, execute, retire, etc.

Exemplary Computer Architectures

Detailed below are describes of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 4:
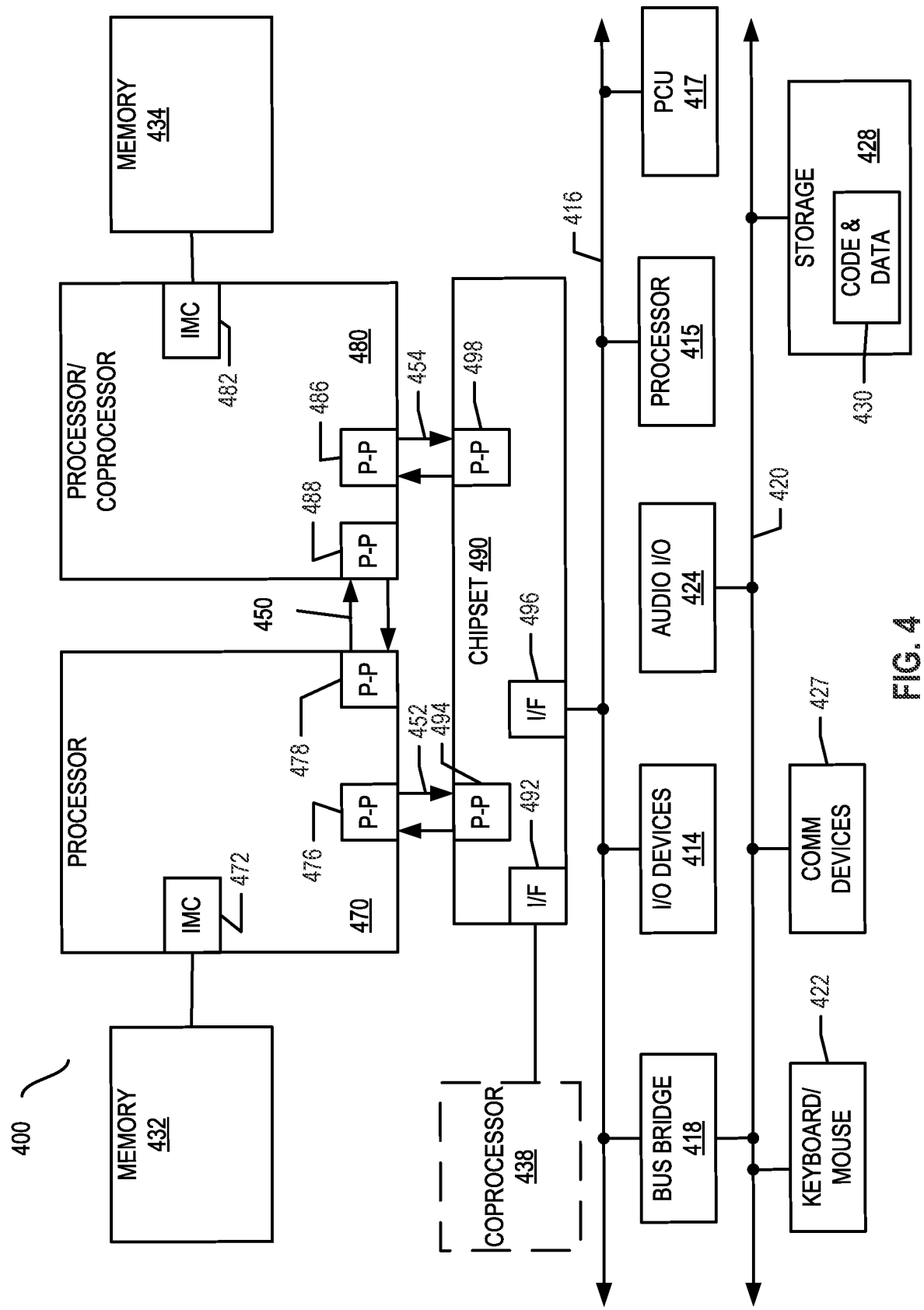
FIG. 4 illustrates embodiments of an exemplary system.

FIG. 4 illustrates embodiments of an exemplary system. Multiprocessor system 400 is a point-to-point interconnect system and includes a plurality of processors including a first processor 470 and a second processor 480 coupled via a point-to-point interconnect 450. In some examples, the first processor 470 and the second processor 480 are homogeneous. In some examples, first processor 470 and the second processor 480 are heterogenous.

Processors 470 and 480 are shown including integrated memory controller (IMC) units circuitry 472 and 482, respectively. Processor 470 also includes as part of its interconnect controller units point-to-point (P-P) interfaces 476 and 478; similarly, second processor 480 includes P-P interfaces 486 and 488. Processors 470, 480 may exchange information via the point-to-point (P-P) interconnect 450 using P-P interface circuits 478, 488. IMCs 472 and 482 couple the processors 470, 480 to respective memories, namely a memory 432 and a memory 434, which may be portions of main memory locally attached to the respective processors.

Processors 470, 480 may each exchange information with a chipset 490 via individual P-P interconnects 452, 454 using point to point interface circuits 476, 494, 486, 498. Chipset 490 may optionally exchange information with a coprocessor 438 via a high-performance interface 492. In some examples, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor 470, 480 or outside of both processors, yet connected with the processors via P-P interconnect, such that either or both processors' local cache information may be stored in the shared cache if a processor is placed into a low power mode.

Chipset 490 may be coupled to a first interconnect 416 via an interface 496. In some examples, first interconnect 416 may be a Peripheral Component Interconnect (PCI) interconnect, or an interconnect such as a PCI Express interconnect or another I/O interconnect. In some examples, one of the interconnects couples to a power control unit (PCU) 417, which may include circuitry, software, and/or firmware to perform power management operations with regard to the processors 470, 480 and/or co-processor 438. PCU 417 provides control information to a voltage regulator to cause the voltage regulator to generate the appropriate regulated voltage. PCU 417 also provides control information to control the operating voltage generated. In various embodiments, PCU 417 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 417 is illustrated as being present as logic separate from the processor 470 and/or processor 480. In other cases, PCU 417 may execute on a given one or more of cores (not shown) of processor 470 or 480. In some cases, PCU 417 may be implemented as a microcontroller (dedicated or general-purpose) or other control logic configured to execute its own dedicated power management code, sometimes referred to as P-code. In yet other embodiments, power management operations to be performed by PCU 417 may be implemented externally to a processor, such as by way of a separate power management integrated circuit (PMIC) or another component external to the processor. In yet other embodiments, power management operations to be performed by PCU 417 may be implemented within BIOS or other system software.

Various I/O devices 414 may be coupled to first interconnect 416, along with an interconnect (bus) bridge 418 which couples first interconnect 416 to a second interconnect 420. In some examples, one or more additional processor(s) 415, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 416. In some examples, second interconnect 420 may be a low pin count (LPC) interconnect. Various devices may be coupled to second interconnect 420 including, for example, a keyboard and/or mouse 422, communication devices 427 and a storage unit circuitry 428. Storage unit circuitry 428 may be a disk drive or other mass storage device which may include instructions/code and data 430, in some examples. Further, an audio I/O 424 may be coupled to second interconnect 420. Note that other architectures than the point-to-point architecture described above are possible. For example, instead of the point-to-point architecture, a system such as multiprocessor system 400 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 5:
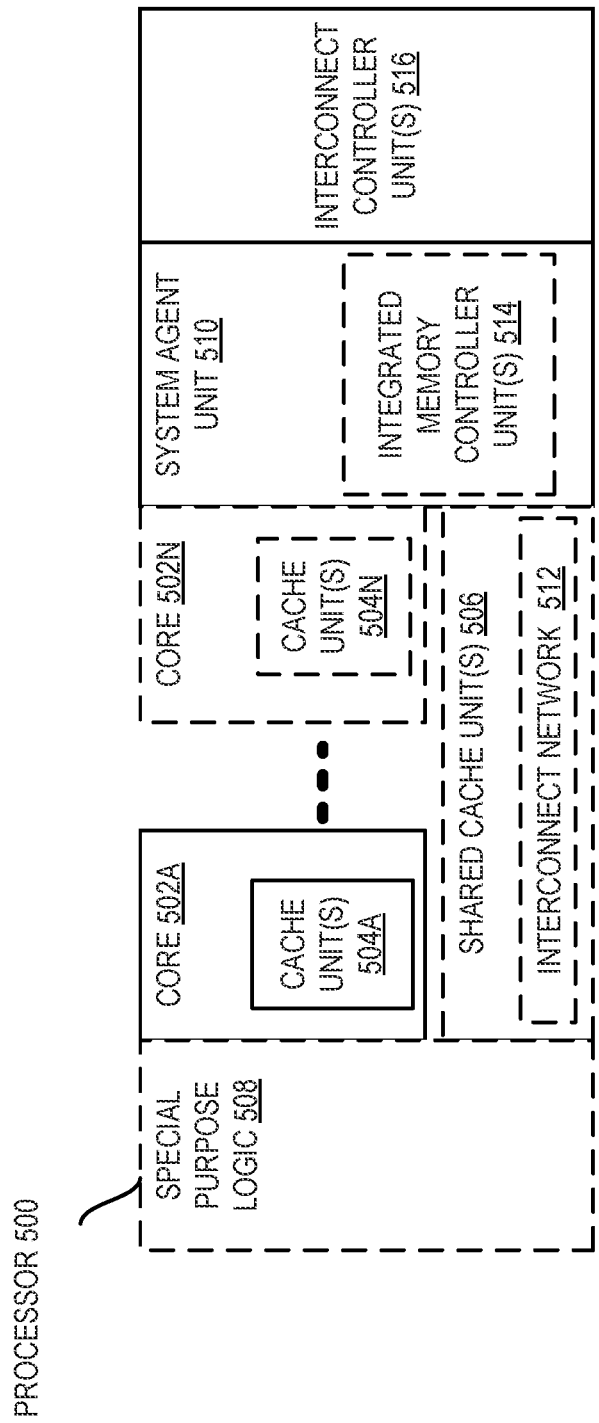
FIG. 5 illustrates a block diagram of embodiments of a processor that may have more than one core, may have an integrated memory controller, and may have integrated graphics.

FIG. 5 illustrates a block diagram of embodiments of a processor 500 that may have more than one core, may have an integrated memory controller, and may have integrated graphics. The solid lined boxes illustrate a processor 500 with a single core 502A, a system agent 510, a set of one or more interconnect controller units circuitry 516, while the optional addition of the dashed lined boxes illustrates an alternative processor 500 with multiple cores 502(A)-(N), a set of one or more integrated memory controller unit(s) circuitry 514 in the system agent unit circuitry 510, and special purpose logic 508, as well as a set of one or more interconnect controller units circuitry 516. Note that the processor 500 may be one of the processors 470 or 480, or co-processor 438 or 415 of FIG. 4.

Thus, different implementations of the processor 500 may include: 1) a CPU with the special purpose logic 508 being integrated graphics and/or scientific (throughput) logic (which may include one or more cores, not shown), and the cores 502(A)-(N) being one or more general purpose cores (e.g., general purpose in-order cores, general purpose out-of-order cores, or a combination of the two); 2) a coprocessor with the cores 502(A)-(N) being a large number of special purpose cores intended primarily for graphics and/or scientific (throughput); and 3) a coprocessor with the cores 502(A)-(N) being a large number of general purpose in-order cores. Thus, the processor 500 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 500 may be a part of and/or may be implemented on one or more substrates using any of a number of process technologies, such as, for example, BiCMOS, CMOS, or NMOS.

A memory hierarchy includes one or more levels of cache unit(s) circuitry 504(A)-(N) within the cores 502(A)-(N), a set of one or more shared cache units circuitry 506, and external memory (not shown) coupled to the set of integrated memory controller units circuitry 514. The set of one or more shared cache units circuitry 506 may include one or more mid-level caches, such as level 2 (L2), level 3 (L3), level 4 (L4), or other levels of cache, such as a last level cache (LLC), and/or combinations thereof. While in some examples ring-based interconnect network circuitry 512 interconnects the special purpose logic 508 (e.g., integrated graphics logic), the set of shared cache units circuitry 506, and the system agent unit circuitry 510, alternative embodiments use any number of well-known techniques for interconnecting such units. In some examples, coherency is maintained between one or more of the shared cache units circuitry 506 and cores 502(A)-(N).

In some examples, one or more of the cores 502(A)-(N) are capable of multi-threading. The system agent unit circuitry 510 includes those components coordinating and operating cores 502(A)-(N). The system agent unit circuitry 510 may include, for example, power control unit (PCU) circuitry and/or display unit circuitry (not shown). The PCU may be or may include logic and components needed for regulating the power state of the cores 502(A)-(N) and/or the special purpose logic 508 (e.g., integrated graphics logic). The display unit circuitry is for driving one or more externally connected displays.

The cores 502(A)-(N) may be homogenous or heterogeneous in terms of architecture instruction set; that is, two or more of the cores 502(A)-(N) may be capable of executing the same instruction set, while other cores may be capable of executing only a subset of that instruction set or a different instruction set.

Exemplary Core Architectures

In-Order and Out-of-Order Core Block Diagram

Figure 6A:
FIG. 6(A) is a block diagram illustrating both an exemplary in-order pipeline and an exemplary register renaming, out-of-order issue/execution pipeline according to some examples.
Figure 6B:
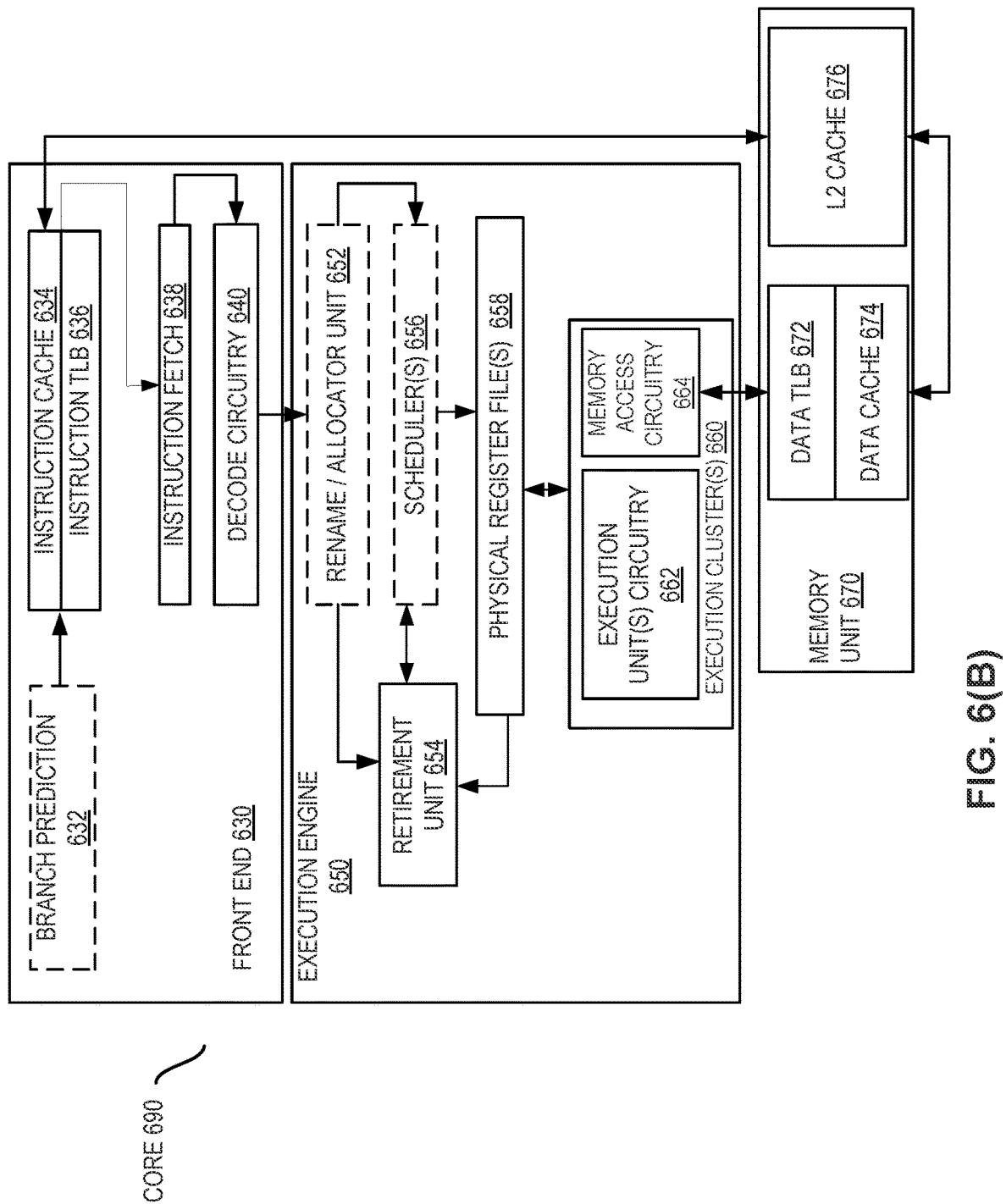
FIG. 6(B) is a block diagram illustrating both an exemplary embodiment of an in-order architecture core and an exemplary register renaming, out-of-order issue/execution architecture core to be included in a processor according to some examples.

FIG. 6(A) is a block diagram illustrating both an exemplary in-order pipeline and an exemplary register renaming, out-of-order issue/execution pipeline according to some examples. FIG. 6(B) is a block diagram illustrating both an exemplary embodiment of an in-order architecture core and an exemplary register renaming, out-of-order issue/execution architecture core to be included in a processor according to some examples. The solid lined boxes in FIGS. 6(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6(A), a processor pipeline 600 includes a fetch stage 602, an optional length decode stage 604, a decode stage 606, an optional allocation stage 608, an optional renaming stage 610, a scheduling (also known as a dispatch or issue) stage 612, an optional register read/memory read stage 614, an execute stage 616, a write back/memory write stage 618, an optional exception handling stage 622, and an optional commit stage 624. One or more operations can be performed in each of these processor pipeline stages. For example, during the fetch stage 602, one or more instructions are fetched from instruction memory, during the decode stage 606, the one or more fetched instructions may be decoded, addresses (e.g., load store unit (LSU) addresses) using forwarded register ports may be generated, and branch forwarding (e.g., immediate offset or an link register (LR)) may be performed. In one embodiment, the decode stage 606 and the register read/memory read stage 614 may be combined into one pipeline stage. In one embodiment, during the execute stage 616, the decoded instructions may be executed, LSU address/data pipelining to an Advanced Microcontroller Bus (AHB) interface may be performed, multiply and add operations may be performed, arithmetic operations with branch results may be performed, etc.

By way of example, the exemplary register renaming, out-of-order issue/execution core architecture may implement the pipeline 600 as follows: 1) the instruction fetch 638 performs the fetch and length decoding stages 602 and 604; 2) the decode unit circuitry 640 performs the decode stage 606; 3) the rename/allocator unit circuitry 652 performs the allocation stage 608 and renaming stage 610; 4) the scheduler unit(s) circuitry 656 performs the schedule stage 612; 5) the physical register file(s) unit(s) circuitry 658 and the memory unit circuitry 670 perform the register read/memory read stage 614; the execution cluster 660 perform the execute stage 616; 6) the memory unit circuitry 670 and the physical register file(s) unit(s) circuitry 658 perform the write back/memory write stage 618; 7) various units (unit circuitry) may be involved in the exception handling stage 622; and 8) the retirement unit circuitry 654 and the physical register file(s) unit(s) circuitry 658 perform the commit stage 624.

FIG. 6(B) shows processor core 690 including front-end unit circuitry 630 coupled to an execution engine unit circuitry 650, and both are coupled to a memory unit circuitry 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit circuitry 630 may include branch prediction unit circuitry 632 coupled to an instruction cache unit circuitry 634, which is coupled to an instruction translation lookaside buffer (TLB) 636, which is coupled to instruction fetch unit circuitry 638, which is coupled to decode unit circuitry 640. In one embodiment, the instruction cache unit circuitry 634 is included in the memory unit circuitry 670 rather than the front-end unit circuitry 630. The decode unit circuitry 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 640 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM (not shown) or other medium that stores microcode for certain macroinstructions (e.g., in decode unit circuitry 640 or otherwise within the front end unit circuitry 630). In one embodiment, the decode unit circuitry 640 includes a micro-operation (micro-op) or operation cache (not shown) to hold/cache decoded operations, micro-tags, or micro-operations generated during the decode or other stages of the processor pipeline 600. The decode unit circuitry 640 may be coupled to rename/allocator unit circuitry 652 in the execution engine unit circuitry 650.

The execution engine circuitry 650 includes the rename/allocator unit circuitry 652 coupled to a retirement unit circuitry 654 and a set of one or more scheduler(s) circuitry 656. The scheduler(s) circuitry 656 represents any number of different schedulers, including reservations stations, central instruction window, etc. In some examples, the scheduler(s) circuitry 656 can include arithmetic logic unit (ALU) scheduler/scheduling circuitry, ALU queues, arithmetic generation unit (AGU) scheduler/scheduling circuitry, AGU queues, etc. The scheduler(s) circuitry 656 is coupled to the physical register file(s) circuitry 658. Each of the physical register file(s) circuitry 658 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit circuitry 658 includes vector registers unit circuitry, writemask registers unit circuitry, and scalar register unit circuitry. These register units may provide architectural vector registers, vector mask registers, general-purpose registers, etc. The physical register file(s) unit(s) circuitry 658 is overlapped by the retirement unit circuitry 654 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 654 and the physical register file(s) circuitry 658 are coupled to the execution cluster(s) 660. The execution cluster(s) 660 includes a set of one or more execution units circuitry 662 and a set of one or more memory access circuitry 664. The execution units circuitry 662 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some examples may include a number of execution units or execution unit circuitry dedicated to specific functions or sets of functions, other embodiments may include only one execution unit circuitry or multiple execution units/execution unit circuitry that all perform all functions. The scheduler(s) circuitry 656, physical register file(s) unit(s) circuitry 658, and execution cluster(s) 660 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 664). It should also be understood that where separate pipelines are used, one or more of these pipelines may be out-of-order issue/execution and the rest in-order.

In some examples, the execution engine unit circuitry 650 may perform load store unit (LSU) address/data pipelining to an Advanced Microcontroller Bus (AHB) interface (not shown), and address phase and writeback, data phase load, store, and branches.

The set of memory access circuitry 664 is coupled to the memory unit circuitry 670, which includes data TLB unit circuitry 672 coupled to a data cache circuitry 674 coupled to a level 2 (L2) cache circuitry 676. In one exemplary embodiment, the memory access units circuitry 664 may include a load unit circuitry, a store address unit circuit, and a store data unit circuitry, each of which is coupled to the data TLB circuitry 672 in the memory unit circuitry 670. The instruction cache circuitry 634 is further coupled to a level 2 (L2) cache unit circuitry 676 in the memory unit circuitry 670. In one embodiment, the instruction cache 634 and the data cache 674 are combined into a single instruction and data cache (not shown) in L2 cache unit circuitry 676, a level 3 (L3) cache unit circuitry (not shown), and/or main memory. The L2 cache unit circuitry 676 is coupled to one or more other levels of cache and eventually to a main memory.

The core 690 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the core 690 includes logic to support a packed data instruction set extension (e.g., AVX1, AVX2), thereby allowing the operations used by many multimedia applications to be performed using packed data.

Exemplary Execution Unit(s) Circuitry

Figure 7:
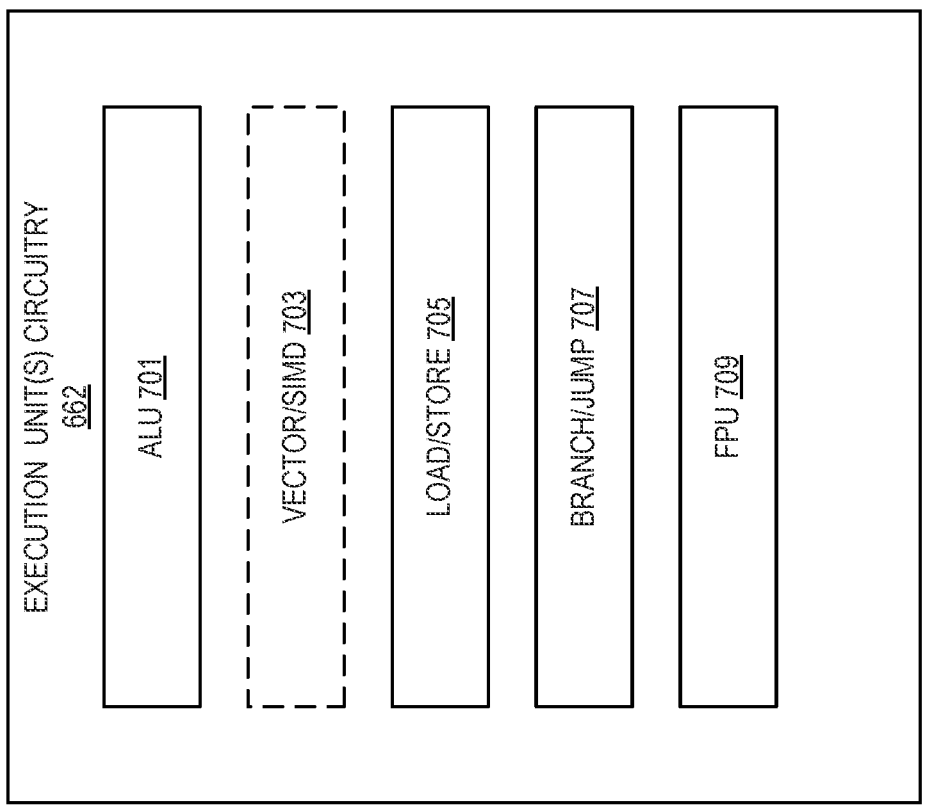
FIG. 7 illustrates embodiments of execution unit(s) circuitry, such as execution unit(s) circuitry of FIG. 6(B).

FIG. 7 illustrates embodiments of execution unit(s) circuitry, such as execution unit(s) circuitry 662 of FIG. 6(B). As illustrated, execution unit(s) circuitry 662 may include one or more ALU circuits 701, vector/SIMD unit circuits 703, load/store unit circuits 705, and/or branch/jump unit circuits 707. ALU circuits 701 perform integer arithmetic and/or Boolean operations. Vector/SIMD unit circuits 703 perform vector/SIMD operations on packed data (such as SIMD/vector registers). Load/store unit circuits 705 execute load and store instructions to load data from memory into registers or store from registers to memory. Load/store unit circuits 705 may also generate addresses. Branch/jump unit circuits 707 cause a branch or jump to a memory address depending on the instruction. Floating-point unit (FPU) circuits 709 perform floating-point arithmetic. The width of the execution unit(s) circuitry 662 varies depending upon the embodiment and can range from 16-bit to 1,024-bit. In some examples, two or more smaller execution units are logically combined to form a larger execution unit (e.g., two 128-bit execution units are logically combined to form a 256-bit execution unit).

Exemplary Register Architecture

Figure 8:
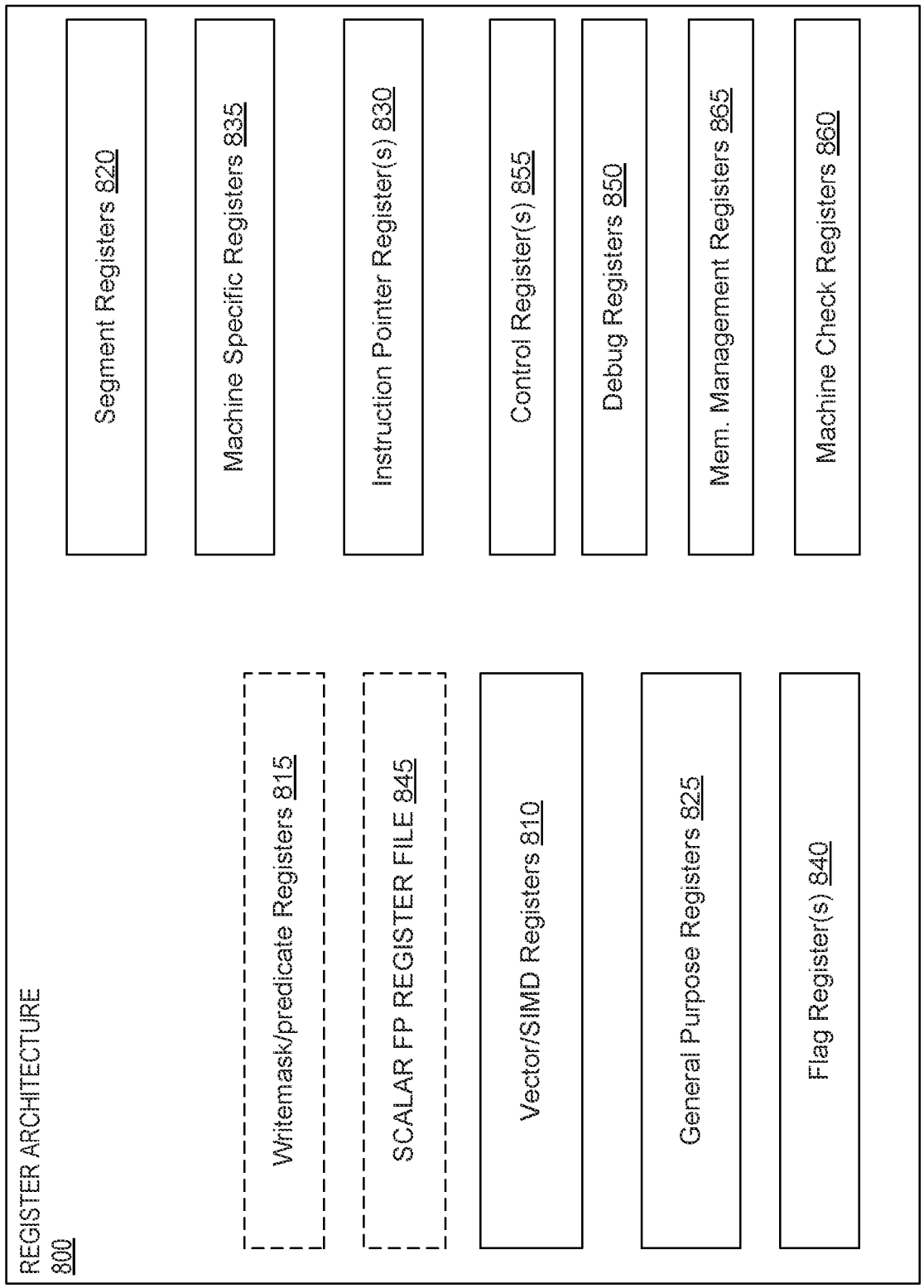
FIG. 8 is a block diagram of a register architecture according to some examples.

FIG. 8 is a block diagram of a register architecture 800 according to some examples. As illustrated, there are vector/SIMD registers 810 that vary from 128-bit to 1,024 bits width. In some examples, the vector/SIMD registers 810 are physically 512-bits and, depending upon the mapping, only some of the lower bits are used. For example, in some examples, the vector/SIMD registers 810 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some examples, the register architecture 800 includes writemask/predicate registers 815. For example, in some examples, there are 8 writemask/predicate registers (sometimes called k0 through k7) that are each 16-bit, 32-bit, 64-bit, or 128-bit in size. Writemask/predicate registers 815 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 815 corresponds to a data element position of the destination. In other embodiments, the writemask/predicate registers 815 are scalable and consists of a set number of enable bits for a given vector element (e.g., 8 enable bits per 64-bit vector element).

The register architecture 800 includes a plurality of general-purpose registers 825. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 800 includes scalar floating-point register 845 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 840 (e.g., EFLAGS, RFLAGS, etc.) store status and control information for arithmetic, compare, and system operations. For example, the one or more flag registers 840 may store condition code information such as carry, parity, auxiliary carry, zero, sign, and overflow. In some examples, the one or more flag registers 840 are called program status and control registers.

Segment registers 820 contain segment points for use in accessing memory. In some examples, these registers are referenced by the names CS, DS, SS, ES, FS, and GS.

Machine specific registers (MSRs) 835 control and report on processor performance. Most MSRs 835 handle system-related functions and are not accessible to an application program. Machine check registers 860 consist of control, status, and error reporting MSRs that are used to detect and report on hardware errors.

One or more instruction pointer register(s) 830 store an instruction pointer value. Control register(s) 855 (e.g., CR0-CR4) determine the operating mode of a processor (e.g., processor 470, 480, 438, 415, and/or 500) and the characteristics of a currently executing task. Debug registers 850 control and allow for the monitoring of a processor or core's debugging operations.

Memory management registers 865 specify the locations of data structures used in protected mode memory management. These registers may include a GDTR, IDRT, task register, and a LDTR register.

Alternative some examples may use wider or narrower registers. Additionally, alternative some examples may use more, less, or different register files and registers.

Instruction Sets

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figure 9:
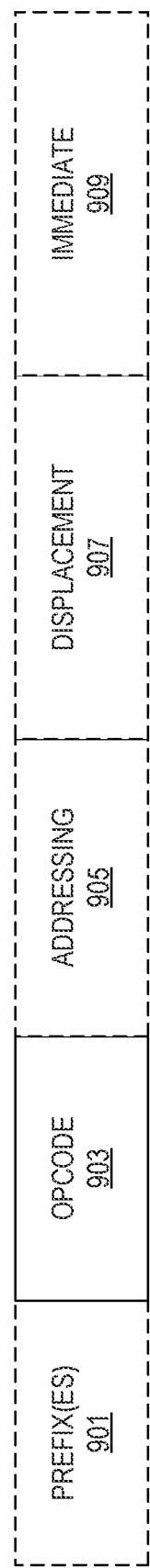
FIG. 9 illustrates embodiments of an instruction format.

FIG. 9 illustrates embodiments of an instruction format. As illustrated, an instruction may include multiple components including, but not limited to, one or more fields for: one or more prefixes 901, an opcode 903, addressing information 905 (e.g., register identifiers, memory addressing information, etc.), a displacement value 907, and/or an immediate 909. Note that some instructions utilize some or all of the fields of the format whereas others may only use the field for the opcode 903. In some examples, the order illustrated is the order in which these fields are to be encoded, however, it should be appreciated that in other embodiments these fields may be encoded in a different order, combined, etc.

The prefix(es) field(s) 901, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 903 is used to at least partially define the operation to be performed upon a decoding of the instruction. In some examples, a primary opcode encoded in the opcode field 903 is 1, 2, or 3 bytes in length. In other embodiments, a primary opcode can be a different length. An additional 3-bit opcode field is sometimes encoded in another field.

Figure 10:
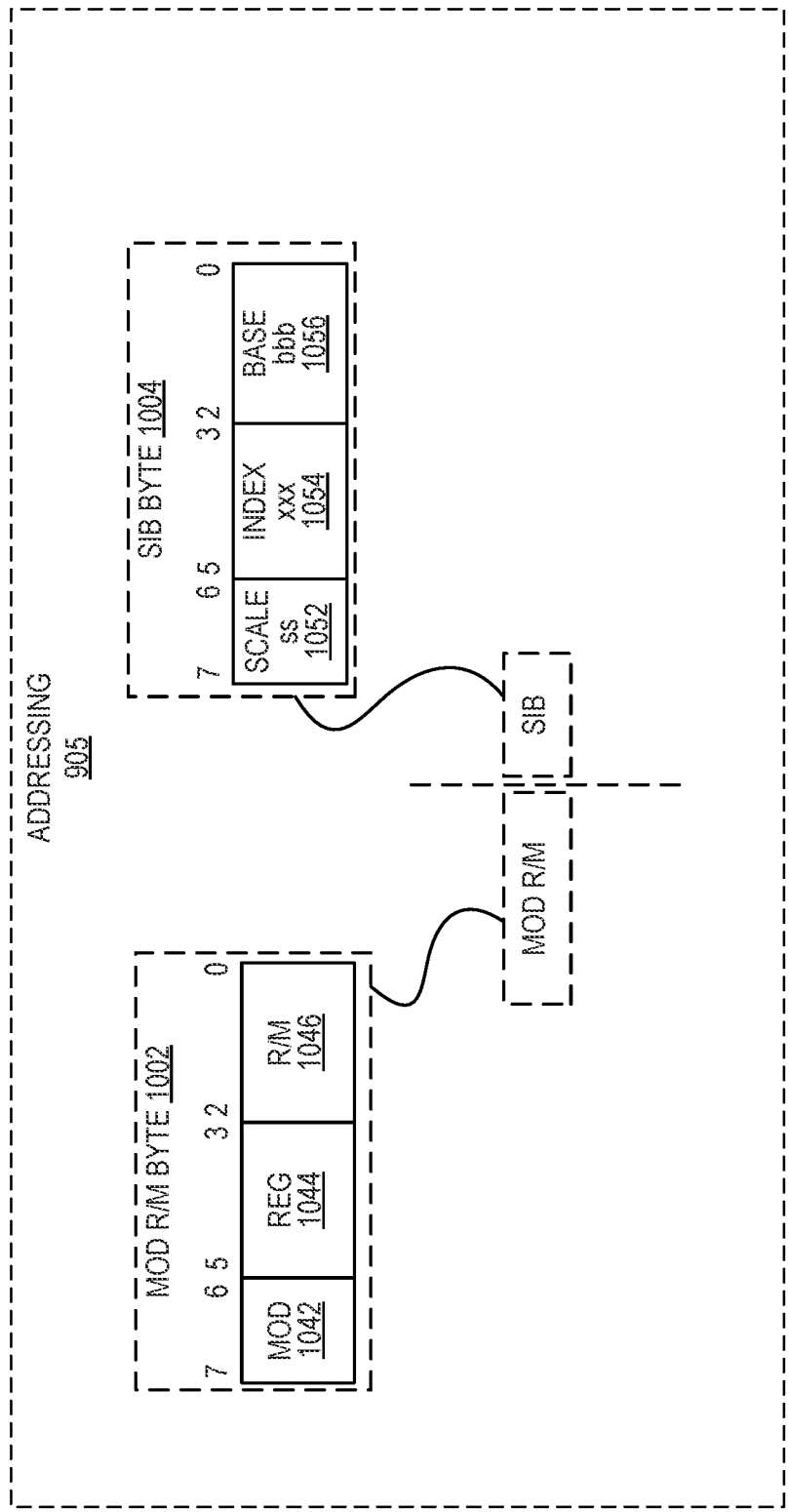
FIG. 10 illustrates embodiments of an addressing field.

The addressing field 905 is used to address one or more operands of the instruction, such as a location in memory or one or more registers. FIG. 10 illustrates embodiments of the addressing field 905. In this illustration, an optional ModR/M byte 1002 and an optional Scale, Index, Base (SIB) byte 1004 are shown. The ModR/M byte 1002 and the SIB byte 1004 are used to encode up to two operands of an instruction, each of which is a direct register or effective memory address. Note that each of these fields are optional in that not all instructions include one or more of these fields. The MOD R/M byte 1002 includes a MOD field 1042, a register field 1044, and R/M field 1046.

The content of the MOD field 1042 distinguishes between memory access and non-memory access modes. In some examples, when the MOD field 1042 has a value of b11, a register-direct addressing mode is utilized, and otherwise register-indirect addressing is used.

The register field 1044 may encode either the destination register operand or a source register operand, or may encode an opcode extension and not be used to encode any instruction operand. The content of register index field 1044, directly or through address generation, specifies the locations of a source or destination operand (either in a register or in memory). In some examples, the register field 1044 is supplemented with an additional bit from a prefix (e.g., prefix 901) to allow for greater addressing.

The R/M field 1046 may be used to encode an instruction operand that references a memory address, or may be used to encode either the destination register operand or a source register operand. Note the R/M field 1046 may be combined with the MOD field 1042 to dictate an addressing mode in some examples.

The SIB byte 1004 includes a scale field 1052, an index field 1054, and a base field 1056 to be used in the generation of an address. The scale field 1052 indicates scaling factor. The index field 1054 specifies an index register to use. In some examples, the index field 1054 is supplemented with an additional bit from a prefix (e.g., prefix 901) to allow for greater addressing. The base field 1056 specifies a base register to use. In some examples, the base field 1056 is supplemented with an additional bit from a prefix (e.g., prefix 901) to allow for greater addressing. In practice, the content of the scale field 1052 allows for the scaling of the content of the index field 1054 for memory address generation (e.g., for address generation that uses $2^{scale}$*index+base).

Some addressing forms utilize a displacement value to generate a memory address. For example, a memory address may be generated according to $2^{scale}$*index+base+displacement, index*scale+displacement, r/m+displacement, instruction pointer (RIP/EIP)+displacement, register+displacement, etc. The displacement may be a 1-byte, 2-byte, 4-byte, etc. value. In some examples, a displacement field 907 provides this value. Additionally, in some examples, a displacement factor usage is encoded in the MOD field of the addressing field 905 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 907.

In some examples, an immediate field 909 specifies an immediate for the instruction. An immediate may be encoded as a 1-byte value, a 2-byte value, a 4-byte value, etc.

FIG. 11 illustrates embodiments of a first prefix 901(A). In some examples, the first prefix 901(A) is an embodiment of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 901(A) may specify up to three registers using 3-bit fields depending on the format: 1) using the reg field 1044 and the R/M field 1046 of the Mod R/M byte 1002; 2) using the Mod R/M byte 1002 with the SIB byte 1004 including using the reg field 1044 and the base field 1056 and index field 1054; or 3) using the register field of an opcode.

In the first prefix 901(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1044 and MOD R/M R/M field 1046 alone can each only address 8 registers.

In the first prefix 901(A), bit position 2 (R) may an extension of the MOD R/M reg field 1044 and may be used to modify the ModR/M reg field 1044 when that field encodes a general purpose register, a 64-bit packed data register (e.g., a SSE register), or a control or debug register. R is ignored when Mod R/M byte 1002 specifies other registers or defines an extended opcode.

Bit position 1 (X) X bit may modify the SIB byte index field 1054.

Bit position B (B) B may modify the base in the Mod R/M R/M field 1046 or the SIB byte base field 1056; or it may modify the opcode register field used for accessing general purpose registers (e.g., general purpose registers 825).

FIGS. 12(A)-(D) illustrate embodiments of how the R, X, and B fields of the first prefix 901(A) are used. FIG. 12(A) illustrates R and B from the first prefix 901(A) being used to extend the reg field 1044 and R/M field 1046 of the MOD R/M byte 1002 when the SIB byte 10 04 is not used for memory addressing. FIG. 12(B) illustrates R and B from the first prefix 901(A) being used to extend the reg field 1044 and R/M field 1046 of the MOD R/M byte 1002 when the SIB byte 10 04 is not used (register-register addressing). FIG. 12(C) illustrates R, X, and B from the first prefix 901(A) being used to extend the reg field 1044 of the MOD R/M byte 1002 and the index field 1054 and base field 1056 when the SIB byte 10 04 being used for memory addressing. FIG. 12(D) illustrates B from the first prefix 901(A) being used to extend the reg field 1044 of the MOD R/M byte 1002 when a register is encoded in the opcode 903.

Figure 13A:
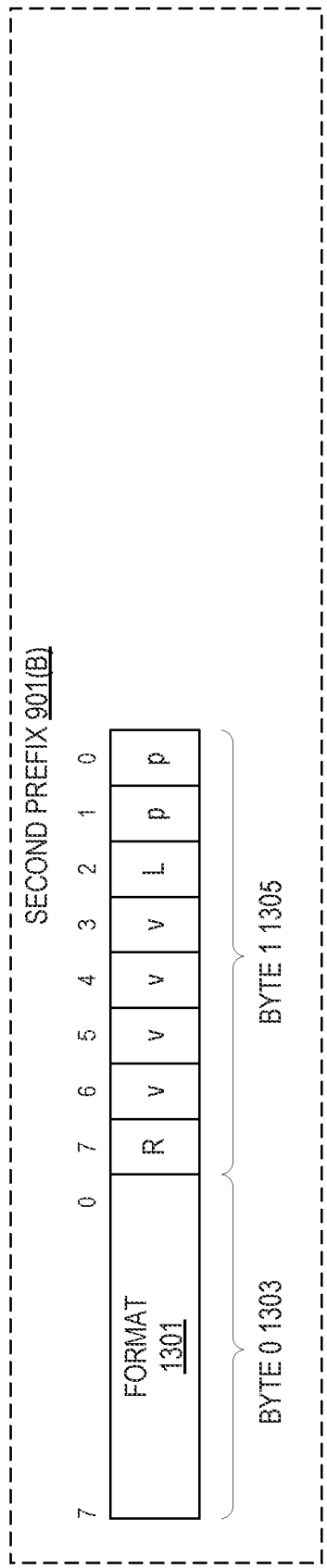
FIGS. 13(A)-(B) illustrate embodiments of a second prefix.
Figure 13B:
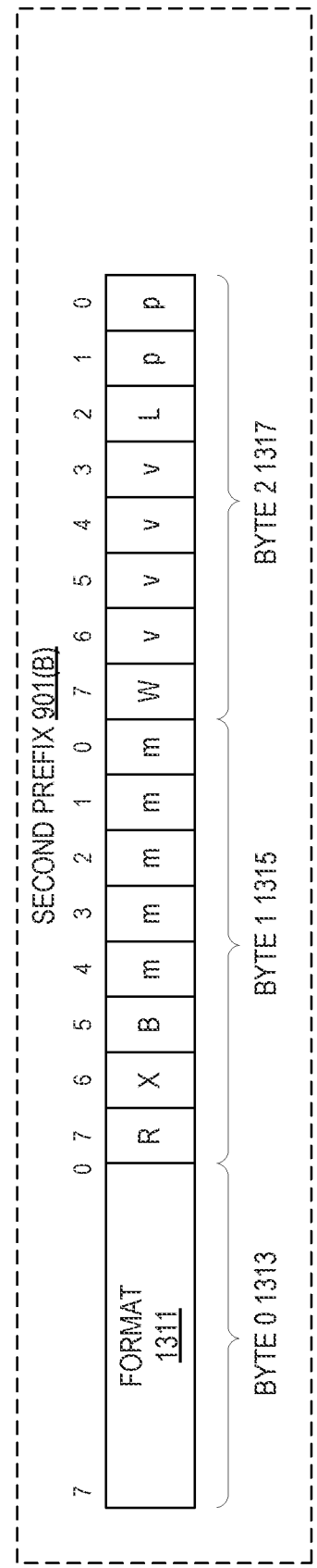

FIGS. 13(A)-(B) illustrate embodiments of a second prefix 901(B). In some examples, the second prefix 901(B) is an embodiment of a VEX prefix. The second prefix 901(B) encoding allows instructions to have more than two operands, and allows SIMD vector registers (e.g., vector/SIMD registers 810) to be longer than 64-bits (e.g., 128-bit and 256-bit). The use of the second prefix 901(B) provides for three-operand (or more) syntax. For example, previous two-operand instructions performed operations such as A=A+B, which overwrites a source operand. The use of the second prefix 901(B) enables operands to perform nondestructive operations such as A=B+C.

In some examples, the second prefix 901(B) comes in two forms—a two-byte form and a three-byte form. The two-byte second prefix 901(B) is used mainly for 128-bit, scalar, and some 256-bit instructions; while the three-byte second prefix 901(B) provides a compact replacement of the first prefix 901(A) and 3-byte opcode instructions.

FIG. 13(A) illustrates embodiments of a two-byte form of the second prefix 901(B). In one example, a format field 1301 (byte 0 1303) contains the value C5H. In one example, byte 1 1305 includes a "R" value in bit[7]. This value is the complement of the same value of the first prefix 901(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1046 to encode the instruction operand that references a memory address or encode either the destination register operand or a source register operand.

Instructions that use this prefix may use the Mod R/M reg field 1044 to encode either the destination register operand or a source register operand, be treated as an opcode extension and not used to encode any instruction operand.

For instruction syntax that support four operands, vvvv, the Mod R/M R/M field 1046 and the Mod R/M reg field 1044 encode three of the four operands. Bits[7:4] of the immediate 909 are then used to encode the third source register operand.

FIG. 13(B) illustrates embodiments of a three-byte form of the second prefix 901(B). in one example, a format field 1311 (byte 0 1313) contains the value C4H. Byte 1 1315 includes in bits[7:5] "R," "X," and "B" which are the complements of the same values of the first prefix 901(A). Bits[4:0] of byte 1 1315 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1317 is used similar to W of the first prefix 901(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1046 to encode the instruction operand that references a memory address or encode either the destination register operand or a source register operand.

Instructions that use this prefix may use the Mod R/M reg field 1044 to encode either the destination register operand or a source register operand, be treated as an opcode extension and not used to encode any instruction operand.

For instruction syntax that support four operands, vvvv, the Mod R/M R/M field 1046, and the Mod R/M reg field 1044 encode three of the four operands. Bits[7:4] of the immediate 909 are then used to encode the third source register operand.

Figure 14:
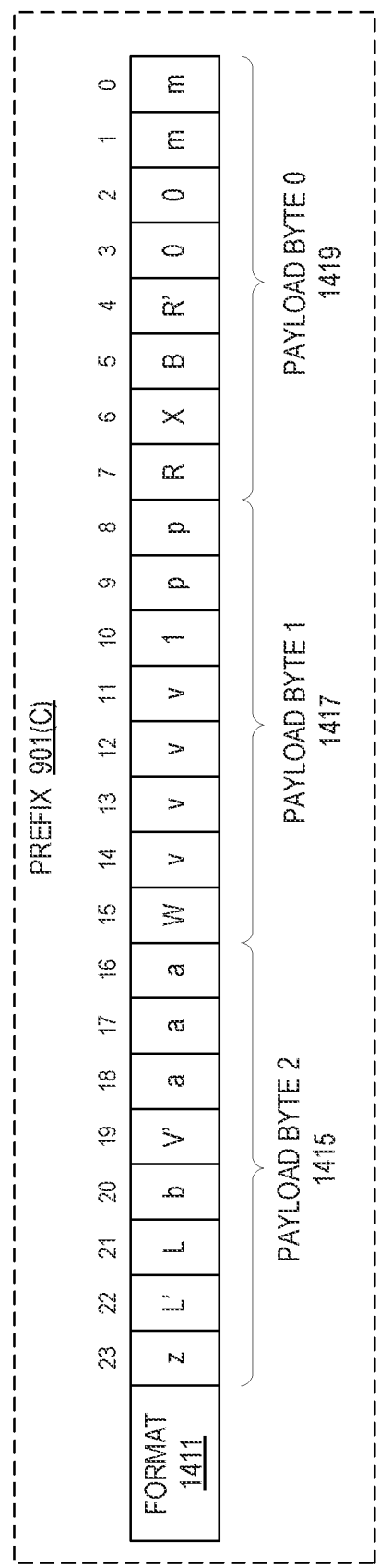
FIG. 14 illustrates embodiments of a third prefix.

FIG. 14 illustrates embodiments of a third prefix 901(C). In some examples, the first prefix 901(A) is an embodiment of an EVEX prefix. The third prefix 901(C) is a four-byte prefix.

The third prefix 901(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 8) or predication utilize this prefix. Opmask register allow for conditional processing or selection control. Opmask instructions, whose source/destination operands are opmask registers and treat the content of an opmask register as a single value, are encoded using the second prefix 901(B).

The third prefix 901(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 901(C) is a format field 1411 that has a value, in one example, of 62H. Subsequent bytes are referred to as payload bytes 1415-1419 and collectively form a 24-bit value of P[23:0] providing specific capability in the form of one or more fields (detailed herein).

In some examples, P[1:0] of payload byte 1419 are identical to the low two mmmmm bits. P[3:2] are reserved in some examples. Bit P[4] (R') allows access to the high 16 vector register set when combined with P[7] and the ModR/M reg field 1044. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1044 and ModR/M R/M field 1046. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 901(A) and second prefix 911(B) and may serve as an opcode extension bit or operand size promotion.

P[18:16] specify the index of a register in the opmask (writemask) registers (e.g., writemask/predicate registers 815). In one embodiment of the invention, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While some examples are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary embodiments of encoding of registers in instructions using the third prefix 901(C) are detailed in the following tables.

TABLE 1

32-Register Support in 64-bit Mode

| | 4 | 3 | [2:0] | REG.TYPE | COMMON USAGES |
|---|---|---|---|---|---|
| REG | R' | R | ModR/Mreg | GPR, Vector | Destination or Source |
| VVVV | V' | vvvv | | GPR, Vector | 2nd Source or Destination |
| RM | X | B | ModR/MR/M | GPR, Vector | 1st Source or Destination |
| BASE | 0 | B | ModR/MR/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

| | [2:0] | REG.TYPE | COMMON USAGES |
|---|---|---|---|
| REG | ModR/M reg | GPR, Vector | Destination or Source |
| VVVV | vvvv | GPR, Vector | 2$^{nd}$ Source or Destination |
| RM | ModR/M R/M | GPR, Vector | 1$^{st}$ Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3 Opmask Register Specifier Encoding

| | [2:0] | REG.TYPE | COMMON USAGES |
|---|---|---|---|
| REG | ModR/M Reg | k0-k7 | Source |
| VVVV | vvvv | k0-k7 | 2$^{nd}$ Source |
| RM | ModR/M R/M | k0-7 | 1$^{st}$ Source |
| {k1} | aaa | k0$^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Some examples may be implemented as computer programs or program code executing on programmable systems comprising at least one processor, a storage system (including volatile and non-volatile memory and/or storage elements), at least one input device, and at least one output device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, some examples also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
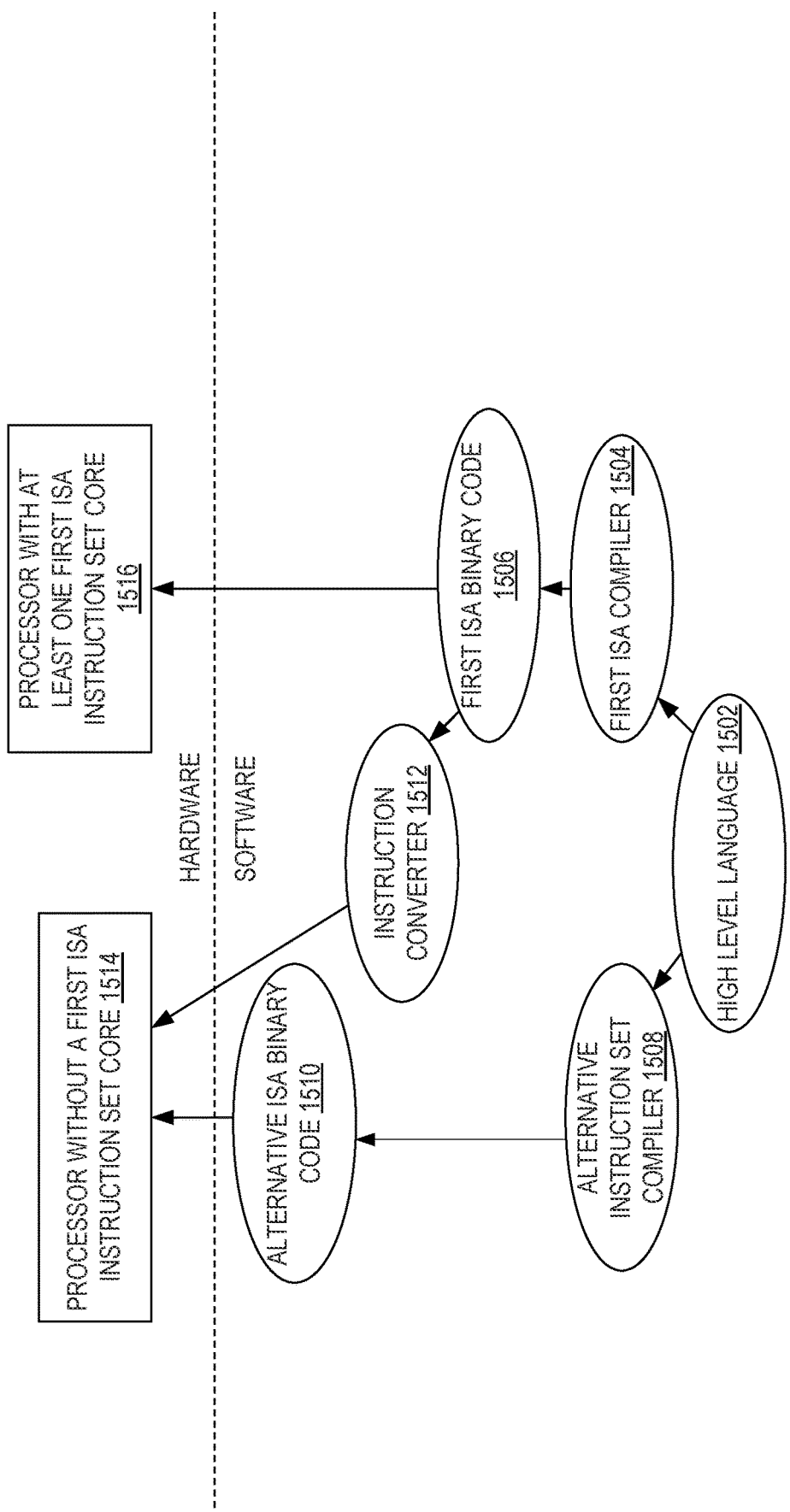
FIG. 15 illustrates a block diagram contrasting the use of a software instruction converter to convert binary instructions in a source instruction set to binary instructions in a target instruction set according to some examples.

FIG. 15 illustrates a block diagram contrasting the use of a software instruction converter to convert binary instructions in a source instruction set to binary instructions in a target instruction set according to some examples. In the illustrated embodiment, the instruction converter is a software instruction converter, although alternatively the instruction converter may be implemented in software, firmware, hardware, or various combinations thereof. FIG. 15 shows a program in a high level language 1502 may be compiled using a first ISA compiler 1504 to generate first ISA binary code 1506 that may be natively executed by a processor with at least one first instruction set core 1516. The processor with at least one first ISA instruction set core 1516 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 1504 represents a compiler that is operable to generate first ISA binary code 1506 (e.g., object code) that can, with or without additional linkage processing, be executed on the processor with at least one first ISA instruction set core 1516. Similarly, FIG. 15 shows the program in the high level language 1502 may be compiled using an alternative instruction set compiler 1508 to generate alternative instruction set binary code 1510 that may be natively executed by a processor without a first ISA instruction set core 1514. The instruction converter 1512 is used to convert the first ISA binary code 1506 into code that may be natively executed by the processor without a first ISA instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have a first ISA instruction set processor or core to execute the first ISA binary code 1506.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Examples include, but are not limited to:

1. An apparatus comprising:
    decoder circuitry to decode an instance of a single instruction, the single instruction to include a field for an opcode, the opcode to indicate execution circuitry is to copy from a first register a saturation flag value, an overflow value, and a carry value to a second register; and
    execution circuitry to execute the decoded instruction according to the opcode of the instance of the single instruction.
2. The apparatus of example 1, wherein the second register is a flags register.
3. The apparatus of example 2, wherein the saturation flag value is to be copied into a parity flag, the overflow value is to be copied into an overflow flag, and the carry value is to be copied into a carry flag
4. The apparatus of example 3, wherein the opcode is to additionally indicate that execution circuitry is to set a sign flag, auxiliary carry flag, and a zero flag are to be set to 0.
5. The apparatus of any of examples 1-4, wherein the first register is a control and/or status register.
6. A method comprising:
    decoding an instance of a single instruction, the single instruction to include a field for an opcode, the opcode to indicate execution circuitry is to copy from a first register a saturation flag value, an overflow value, and a carry value to a second register; and
    executing the decoded instruction according to the opcode.
7. The method of example 6, wherein the second register is a flags register.

8. The method of example 7, wherein the saturation flag value is to be copied into a parity flag, the overflow value is to be copied into an overflow flag, and the carry value is to be copied into a carry flag
9. The method of example 8, wherein the opcode is to additionally indicate that execution circuitry is to set a sign flag, auxiliary carry flag, and a zero flag are to be set to 0.
10. The method of any of examples 6-9, wherein the first register is a control and/or status register.
11. An apparatus comprising:
    an instruction translator to translate an instance of a single instruction, the single instruction to include a field for an opcode, the opcode to indicate execution circuitry is to copy from a first register a saturation flag value, an overflow value, and a carry value to a second register into one or more instructions of a different instruction set;
    decode circuitry to decode the one or more instructions of the different instruction set; and execution circuitry to execute the decoded one or more instructions of the different instruction set to perform a copy from the first register a saturation flag value, an overflow value, and a carry value to the second register according to the opcode.
12. The apparatus of example 11, wherein the second register is a flags register.
13. The apparatus of example 12, wherein the saturation flag value is to be copied into a parity flag, the overflow value is to be copied into an overflow flag, and the carry value is to be copied into a carry flag
14. The apparatus of example 13, wherein the opcode is to additionally indicate that execution circuitry is to set a sign flag, auxiliary carry flag, and a zero flag are to be set to 0.
15. The apparatus of any of examples 11-14, wherein the first register is a control and/or status register.
16. The apparatus of any of examples 11-15, wherein the instruction translator comprises binary translation software.
17. The apparatus of any of examples 11-16, wherein the instruction translator comprises binary translation circuitry.
18. A non-transitory machine readable medium storing an instance of a single instruction, wherein the instance of the single instruction is to be processed according to a method, the method comprising:
    decoding the instance of the single instruction, the single instruction to include a field for an opcode, the opcode to indicate execution circuitry is to copy from a first register a saturation flag value, an overflow value, and a carry value to a second register; and
    executing the decoded instruction according to the opcode.
19. The non-transitory machine readable medium of example 18, wherein the second register is a flags register.
20. The non-transitory machine readable medium of example 19, wherein the saturation flag value is to be copied into a parity flag, the overflow value is to be copied into an overflow flag, and the carry value is to be copied into a carry flag
21. The non-transitory machine readable medium of example 20, wherein the opcode is to additionally indicate that execution circuitry is to set a sign flag, auxiliary carry flag, and a zero flag are to be set to 0.
22. The non-transitory machine readable medium of any of examples 18-21, wherein the first register is a control and/or status register.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:
1. An apparatus comprising:
    decoder circuitry to decode an instance of a single instruction, the single instruction to include a field for an opcode, the opcode to indicate execution circuitry is to copy from a first register a saturation flag value, an overflow value, and a carry value to a second register, wherein the second register is a flags register and the saturation flag value is to be copied into a parity flag, the overflow value is to be copied into an overflow flag, and the carry value is to be copied into a carry flag; and
    execution circuitry to execute the decoded instance of the single instruction according to the opcode of the instance of the single instruction.
2. The apparatus of claim 1, wherein the opcode is to additionally indicate that execution circuitry is to set a sign flag, auxiliary carry flag, and a zero flag are to be set to 0.
3. The apparatus of claim 1, wherein the first register is a control and/or status register.
4. A method comprising:
    decoding an instance of a single instruction, the single instruction to include a field for an opcode, the opcode to indicate execution circuitry is to copy from a first register a saturation flag value, an overflow value, and a carry value to a second register, wherein the second register is a flags register and the saturation flag value is to be copied into a parity flag, the overflow value is to be copied into an overflow flag, and the carry value is to be copied into a carry flag; and
    executing the decoded instance of the single instruction according to the opcode.
5. The method of claim 4, wherein the opcode is to additionally indicate that execution circuitry is to set a sign flag, auxiliary carry flag, and a zero flag are to be set to 0.
6. The method of claim 4, wherein the first register is a control and/or status register.
7. An apparatus comprising:
    an instruction translator to translate an instance of a single instruction, the single instruction to include a field for an opcode, the opcode to indicate execution circuitry is to copy from a first register a saturation flag value, an overflow value, and a carry value to a second register, wherein the second register is a flags register and the saturation flag value is to be copied into a parity flag, the overflow value is to be copied into an overflow flag, and the carry value is to be copied into a carry flag, into one or more instructions of a different instruction set;
    decode circuitry to decode the one or more instructions of the different instruction set; and execution circuitry to execute the decoded one or more instructions of the different instruction set to perform a copy from the first register a saturation flag value, an overflow value, and a carry value to the second register according to the opcode.

8. The apparatus of claim 7, wherein the opcode is to additionally indicate that execution circuitry is to set a sign flag, auxiliary carry flag, and a zero flag are to be set to 0.

9. The apparatus of claim 7, wherein the first register is a control and/or status register.

10. The apparatus of claim 7, wherein the instruction translator comprises binary translation software.

11. The apparatus of claim 7, wherein the instruction translator comprises binary translation circuitry.

12. A non-transitory machine readable medium storing an instance of a single instruction, wherein the instance of the single instruction is to be processed according to a method, the method comprising:

decoding the instance of the single instruction, the single instruction to include a field for an opcode, the opcode to indicate execution circuitry is to copy from a first register a saturation flag value, an overflow value, and a carry value to a second register, wherein the second register is a flags register and the saturation flag value is to be copied into a parity flag, the overflow value is to be copied into an overflow flag, and the carry value is to be copied into a carry flag; and executing the decoded instance of the single instruction according to the opcode.

13. The non-transitory machine readable medium of claim 12, wherein the opcode is to additionally indicate that execution circuitry is to set a sign flag, auxiliary carry flag, and a zero flag are to be set to 0.

14. The non-transitory machine readable medium of claim 12, wherein the first register is a control and/or status register.

* * * * *